US011390272B2

(12) United States Patent
Kasai et al.

(10) Patent No.: US 11,390,272 B2
(45) Date of Patent: Jul. 19, 2022

(54) PARKING ASSISTANCE DEVICE

(71) Applicant: HITACHI AUTOMOTIVE SYSTEMS, LTD., Hitachinaka (JP)

(72) Inventors: Shinya Kasai, Tokyo (JP); Masashi Seimiya, Hitachinaka (JP); Masato Imai, Tokyo (JP); Naoyuki Tashiro, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 28 days.

(21) Appl. No.: 16/979,236

(22) PCT Filed: Feb. 13, 2019

(86) PCT No.: PCT/JP2019/004954
§ 371 (c)(1),
(2) Date: Sep. 9, 2020

(87) PCT Pub. No.: WO2019/187716
PCT Pub. Date: Oct. 3, 2019

(65) Prior Publication Data
US 2020/0398829 A1 Dec. 24, 2020

(30) Foreign Application Priority Data
Mar. 28, 2018 (JP) .............................. JP2018-061843

(51) Int. Cl.
*B60W 30/06* (2006.01)
*B60W 30/14* (2006.01)
(Continued)

(52) U.S. Cl.
CPC ............. *B60W 30/06* (2013.01); *B60K 35/00* (2013.01); *B60W 30/143* (2013.01);
(Continued)

(58) Field of Classification Search
CPC ............... B60W 30/06; B60W 30/143; B60W 2554/80; B60K 35/00; B60K 2370/152;
(Continued)

(56) References Cited

U.S. PATENT DOCUMENTS 6,102,147 A      8/2000  Shimizu
2001/0027371 A1* 10/2001  Winner .............. B60K 31/0008
                                                    701/96
(Continued)

FOREIGN PATENT DOCUMENTS

CN    108928343 A  * 12/2018
CN    106945660 B  *  9/2019  ............ B60W 30/06
(Continued)

OTHER PUBLICATIONS

International Search Report with English translation and Written Opinion issued in corresponding application No. PCT/JP2019/004954 dated Apr. 16, 2019.

*Primary Examiner* — Chico A Foxx
(74) *Attorney, Agent, or Firm* — Foley & Lardner LLP

(57) ABSTRACT

Unfortunately, even when a new area, which cannot be recognized from the parking start position, is detected in the surrounding area as the vehicle travels on the parking route, the new area cannot be used effectively as the parking route. In step S304, when there is an area for extending the parking route in the newly detected area, the route is determined to be extensible. In step S305, it is determined whether the vehicle can be parked with one turnabout without extending the route, and when it is determined that the vehicle cannot be parked with one turnabout, the process proceeds to step S307 to perform the route extension process. When the posture of the vehicle at the turning point does not exceed a predetermined value in step S306, the process also proceeds to step S307. In step S307, route information for extending the parking route from the turning point in the route infor- (Continued)

mation toward the newly detected available area is generated based on the route information output in step S302, the surrounding area information and the own-vehicle position information output in step S303.

9 Claims, 10 Drawing Sheets

(51) Int. Cl.
    *B62D 15/02*     (2006.01)
    *B60K 35/00*     (2006.01)
    *G06K 9/00*     (2022.01)
    *G06V 20/58*     (2022.01)

(52) U.S. Cl.
    CPC ....... *B62D 15/028* (2013.01); *B62D 15/0285* (2013.01); *G06V 20/58* (2022.01); *G06V 20/586* (2022.01); *B60K 2370/152* (2019.05); *B60K 2370/166* (2019.05); *B60K 2370/176* (2019.05); *B60K 2370/347* (2019.05); *B60W 2554/80* (2020.02)

(58) Field of Classification Search
    CPC ........ B60K 2370/166; B60K 2370/176; B60K 2370/347; B62D 15/028; B62D 15/0285; G06K 9/00805; G06K 9/00812
    See application file for complete search history.

(56) References Cited

U.S. PATENT DOCUMENTS

| | | | |
|---|---|---|---|
| 2011/0095910 A1* | 4/2011 | Takano | B60R 1/00 340/932.2 |
| 2011/0273310 A1 | 11/2011 | Kadowaki | |
| 2013/0085637 A1* | 4/2013 | Grimm | G05D 1/00 701/25 |
| 2013/0120161 A1* | 5/2013 | Wakabayashi | B62D 15/028 340/932.2 |
| 2014/0163862 A1* | 6/2014 | Choi | G01C 21/26 701/400 |
| 2016/0318551 A1 | 11/2016 | Terkes | |
| 2017/0129486 A1* | 5/2017 | Nakada | B60W 10/20 |
| 2018/0297589 A1 | 10/2018 | Hasejima | |
| 2020/0369262 A1* | 11/2020 | Suzuki | G06K 9/00798 |
| 2021/0291814 A1* | 9/2021 | Shirozono | B60W 30/09 |

FOREIGN PATENT DOCUMENTS

| | | |
|---|---|---|
| JP | H10-287260 A | 10/1998 |
| JP | 2010-195224 A | 9/2010 |
| JP | 2017-503701 A | 2/2017 |
| JP | 2017-81398 A | 5/2017 |
| JP | 2018-034540 A | 3/2018 |
| JP | 2018-39293 A | 3/2018 |

\* cited by examiner

PARKING ASSISTANCE DEVICE

TECHNICAL FIELD

The present invention relates to a parking assistance device.

BACKGROUND ART

There have been parking assistance devices that automatically park a vehicle at a target parking position by automatic steering. This parking assistance device recognizes the surrounding area of the vehicle and generates a parking route by geometrically calculating a route and the amount of steering angle from a parking start position to a target parking position, thereby automatically parking a vehicle without a driver's steering operation. As a parking assistance device like this, PTL 1 discloses a technique of calculating a parking route based on the surrounding area of the vehicle that has been recognized at a parking start position.

CITATION LIST

Patent Literature

PTL 1: JP 2017-81398 A

SUMMARY OF INVENTION

Technical Problem

Unfortunately, even when a new area, which cannot be recognized from the parking start position, is detected in the surrounding area as the vehicle travels on the parking route, PTL 1 cannot effectively use the new area as the parking route.

Solution to Problem

A parking assistance device according to the present invention includes: a surrounding-area recognition unit configured to recognize a surrounding area of a vehicle by acquiring external information; and a route generation unit configured to generate a parking route from a current position of the vehicle to a target parking position based on the recognized surrounding area, wherein when the surrounding-area recognition unit recognizes a new area on an extension of the parking route as the vehicle travels along the parking route, the parking assistance device extends the parking route into the recognized new area.

Advantageous Effects of Invention

The present invention can effectively use as a parking route an area that cannot be recognized from a parking start position and is newly recognized as the vehicle travels.

DESCRIPTION OF EMBODIMENTS

Hereinafter, embodiments of the present invention will be described.

First Embodiment

Figure 1:
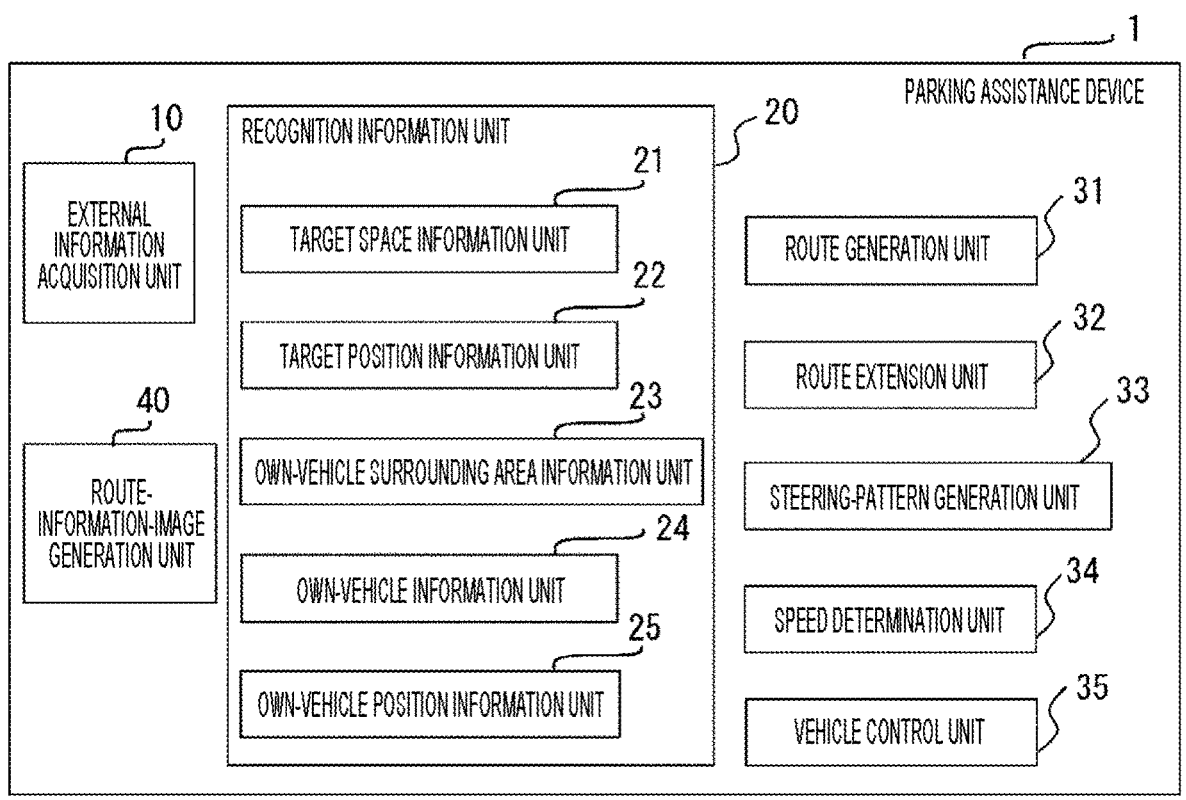
FIG. 1 is a configuration diagram of a parking assistance device according to a first embodiment.

FIG. 1 is a configuration diagram of a parking assistance device 1 according to a first embodiment. As shown in FIG. 1, the parking assistance device 1 includes: an external information acquisition unit 10; a recognition information unit 20; a route generation unit 31; a route extension unit 32; a steering-pattern generation unit 33; and a speed determination unit 34; a vehicle control unit 35; and a route-information-image generation unit 40. Furthermore, the recognition information unit 20 includes a target space information unit 21, a target position information unit 22, an own-vehicle surrounding area information unit 23, an own-vehicle information unit 24, and an own-vehicle position information unit 25.

The parking assistance device 1 is a device configured to acquire external information at the current position, generate recognition information from the external information, generate route information from the current position to the target parking position based on the recognition information, generate steering-angle information for traveling on the parking route according to the own-vehicle position on the parking route, and control the steering wheel based on the steering-angle information.

The external information acquisition unit 10 includes an external-environment recognition sensor mounted on the own vehicle, such as vehicle-mounted cameras. The vehicle-mounted cameras include stereo cameras and monocular cameras. The stereo cameras, which are a device for acquiring information about the surrounding area of the own vehicle, capture the area in front of the own vehicle while measuring the distance. The monocular cameras each are mounted on the front, the rear, the right side, and the left side of the own vehicle, and respectively capture their surrounding areas. These vehicle-mounted cameras are used to detect stationary solid objects, moving objects, road surface paint, such as lane-dividing lines and boundary lines of the parking space, around the own vehicle. Laser radars, millimeter-wave radars, and sonars are used for external-environment recognition sensors other than vehicle-mounted cameras. Further, information on the surrounding area may be acquired by road-to-vehicle communication and vehicle-to-vehicle communication.

The target space information unit 21 has information on limiting factors for the target space, such as the position and distance of obstacles around the target parking position. The obstacles here include both stationary solid objects and moving objects. Stationary solid objects include parked vehicles, walls, poles, pylons, curbs, parking stoppers, and the like. Further, the moving objects include pedestrians, bicycles, motorcycles, vehicles, and the like.

The target position information unit 22 has information on the shape of the target parking position, the position of the target parking position relative to the own vehicle, and the like. The own-vehicle surrounding area information unit 23 has spatial information of limiting factors for the surrounding area of the own-vehicle, such as the position and distance of obstacles around the own vehicle. The target space information unit 21, the target position information unit 22, and the own-vehicle surrounding area information unit 23 acquire necessary information from the external information acquisition unit 10.

The own-vehicle information unit 24 has information on limiting factors for the behavior of the own vehicle, such as a turning radius of the own vehicle, the upper limit of the angular velocity and a set value of the angular acceleration of the steering wheel. The own-vehicle position information unit 25 uses dead-reckoning in which calculation is performed using the steering angle, the vehicle speed, and the rotation speed of the wheels of the own vehicle based on the vehicle model. Alternatively, the own-vehicle position information unit 25 may use position information acquired by a sensor, such as a global positioning system (GPS) sensor, or position information acquired by road-to-vehicle communication and vehicle-to-vehicle communication.

The route generation unit 31 receives information from the target space information unit 21, the target position information unit 22, the own-vehicle surrounding area information unit 23, the own-vehicle information unit 24, and the own-vehicle position information unit 25 through a dedicated line or a controller area network (CAN). Then, the route generation unit 31 generates route information from the current position to the target parking position based on the received information.

The route extension unit 32 receives information from the own-vehicle surrounding area information unit 23, the own-vehicle information unit 24, and the own-vehicle position information unit 25 through a dedicated line or a CAN. The route extension unit 32 generates route information from the current position to a newly available space of which information is acquired by the own-vehicle surrounding area information unit 23.

The steering-pattern generation unit 33 generates steering-angle information according to the traveling distance based on the route information generated by the route generation unit 31 and the route extension unit 32.

The speed determination unit 34 determines the traveling speed of the own vehicle based on the own-vehicle surrounding area information unit 23, the own-vehicle information unit 24, and the own-vehicle position information unit 25, and the route information generated by the route generation unit 31 and the route extension unit 32.

The vehicle control unit 35 controls the vehicle by using the traveling distance and the vehicle orientation of the own vehicle acquired by the own-vehicle position information unit 25, the steering-angle information generated by the steering-pattern generation unit 33, and the speed information generated by the speed determination unit 34.

The route-information-image generation unit 40 generates an image for presenting the driver with visual information about the parking status by using the information acquired from the external information acquisition unit 10, the target space information unit 21, the target position information unit 22, and the route information generated by the route generation unit 31 and the route extension unit 32. The generated image is displayed on a display device (not shown).

Second Embodiment

Figure 2:
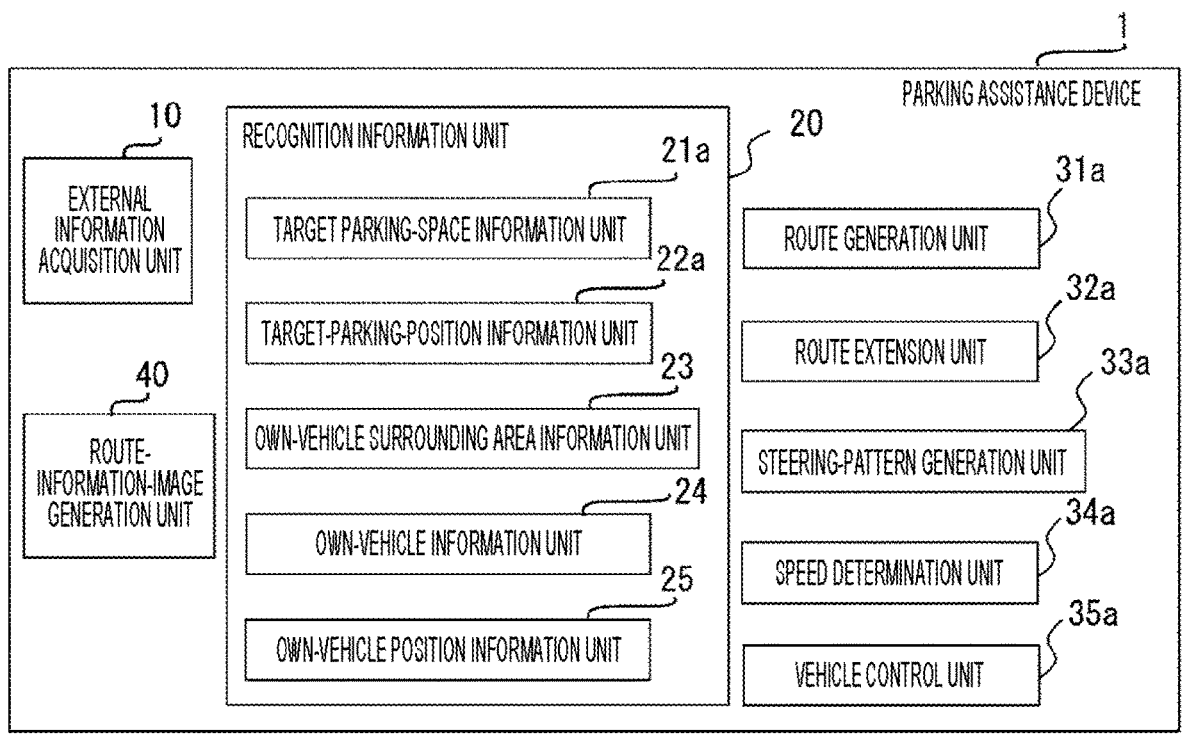
FIG. 2 is a configuration diagram of a parking assistance device according to a second embodiment.

A parking assistance device 1*a* according to a second embodiment will be described with reference to FIG. 2. FIG. 2 is a configuration diagram illustrating the case where the parking assistance device 1 according to the first embodiment shown in FIG. 1 is implemented as a parking assistance device 1*a*. Differences from the parking assistance device 1 of FIG. 1 will be mainly described, whereas the same components as those in the parking assistance device 1 are denoted by the same reference numerals as in FIG. 1, and the description thereof will be omitted.

The parking assistance device 1*a* shown in FIG. 2 includes an external information acquisition unit 10, a recognition information unit 20, a route generation unit 31*a*, a route extension unit 32*a*, a steering-pattern generation unit 33*a*, a speed determination unit 34*a*, and a vehicle control unit 35*a*. Further, the target space information unit 21 of the recognition information unit 20 of FIG. 1 is replaced with a target parking-space information unit 21*a*, and the target position information unit 22 of FIG. 1 is replaced with a target-parking-position information unit 22*a* to achieve automatic parking.

The target parking-space information unit 21*a* has information on limiting factors for the target space, such as the position and distance of obstacles around the target parking position. The target-parking-position information unit 22*a* has information on the shape of the target parking position, the position of the target parking position relative to the own vehicle, and the like.

The route generation unit 31*a* generates a parking route from the current position of the own vehicle to the target parking position as route information including a straight line, an arc, and a transition curve. In addition, the route generation unit 31*a* generates the route information by using a clothoid curve as the transition curve based on the calculation with a constant steering angular velocity.

The route extension unit 32*a* generates extended route information when the tip of the turning point of the parking route generated by the route generation unit 31*a* can be extended into a newly available area of which information is acquired by the own-vehicle surrounding area information unit 23.

The steering-pattern generation unit 33*a* generates steering-angle information corresponding to the traveling distance based on the route information generated by the route generation unit 31*a* and the route extension unit 32*a*. The speed determination unit 34*a* determines the traveling speed of the own vehicle based on the own-vehicle surrounding area information unit 23, the own-vehicle information unit 24, and the own-vehicle position information unit 25, and the route information generated by the route generation unit 31*a* and the route extension unit 32*a*.

The vehicle control unit 35*a* controls the vehicle by using the traveling distance and the vehicle orientation of the own vehicle acquired by the own-vehicle position information unit 25, the steering-angle information generated by the steering-pattern generation unit 33*a*, and the speed information generated by the speed determination unit 34*a*.

Figure 3:
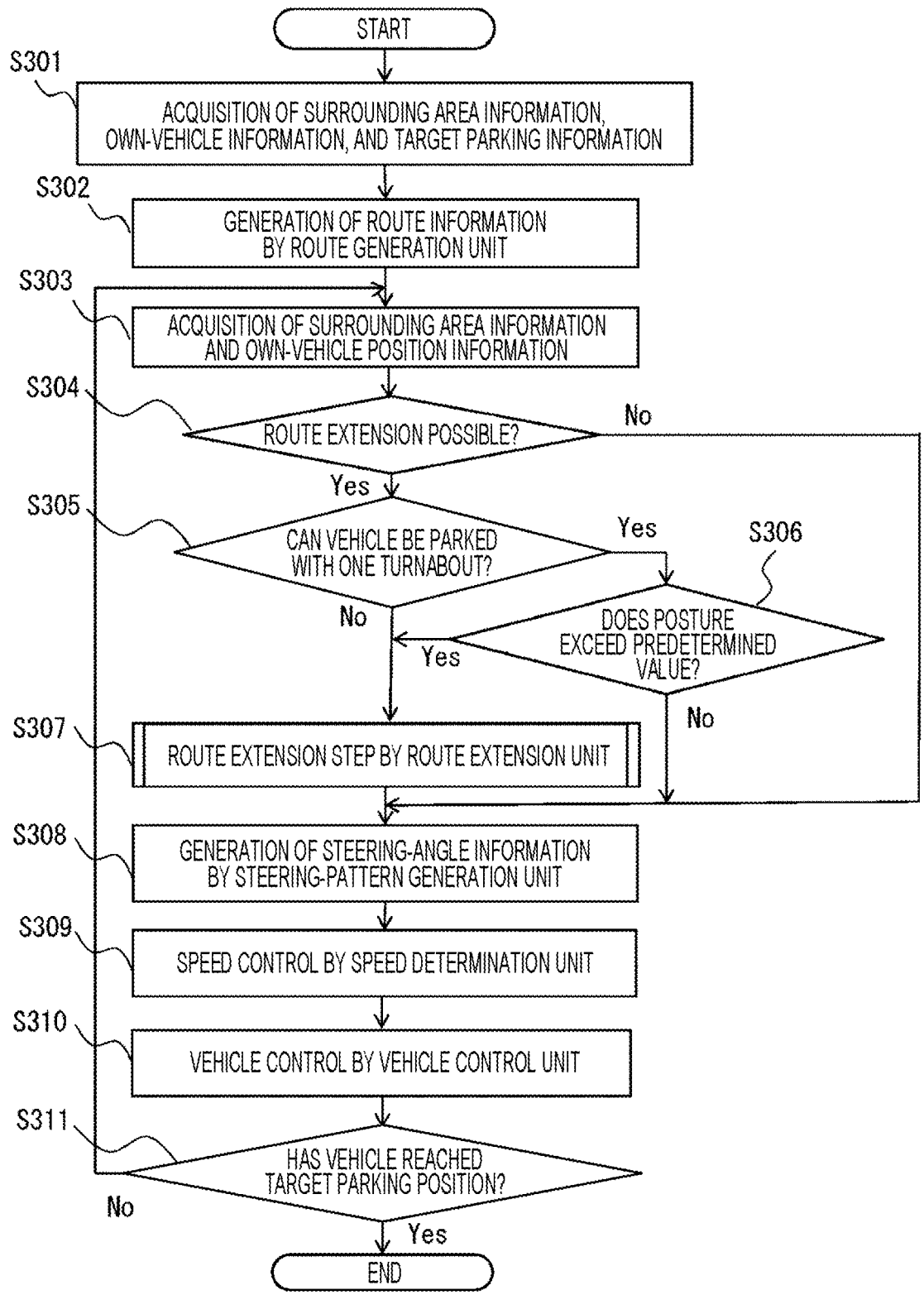
FIG. 3 is a flowchart showing the steps of the process performed by the parking assistance device.

FIG. 3 is a flowchart showing the steps of the process performed by the parking assistance device 1*a*. Note that the program shown in this flowchart can be executed by a computer including a central processing unit (CPU), a memory, and the like. All or part of the process may be performed by a hardware logic circuit. Furthermore, this program can be provided while being stored in advance in a storage medium of the parking assistance device 1a. Alternatively, the program may be provided while being stored in an independent recording medium, or may be recorded and stored in the storage medium of the parking assistance device 1a by using a network line. The program may be provided in various forms of computer-readable program products, such as data signals (carrier waves).

The steps in the flowchart shown in FIG. 3 are sequentially performed while the vehicle is traveling from the parking start position along the parking route. In step S301 of FIG. 3, the external information acquisition unit 10 acquires surrounding area information, own-vehicle information, and target parking information. Here, the surrounding area information is information acquired by the own-vehicle surrounding area information unit 23 using the external-environment recognition sensors. The own vehicle information is information acquired by the own-vehicle information unit 24 and the own-vehicle position information unit 25 using dead-reckoning, a GPS sensor, or the like. The target parking information is information acquired by the target parking-space information unit 21a and the target-parking-position information unit 22a using the external-environment recognition sensors. Next, the process proceeds to step S302.

In step S302, the route generation unit 31a generates a route using the information acquired in step S301, and outputs the generated route information to the steering-pattern generation unit 33a. Then, the process proceeds to step S303.

In step S303, the external information acquisition unit 10 acquires surrounding area information, and the own-vehicle information unit 24 acquires own-vehicle position information, and the process proceeds to step S304.

In step S304, it is determined whether or not there is an area for extending the parking route in a newly recognized area based on the route information that has been output in step S302, the surrounding area information and the own-vehicle position information that have been output in step S303. When there is an area for extending the parking route in the newly recognized area, the route is determined to be extensible, and the process proceeds to step S305. When the route is determined to be inextensible, the process proceeds to step S308 described later.

In step S305, it is determined whether the vehicle can be parked with one turnabout without extending the route. When the vehicle can be parked with one turnabout, the process proceeds to the next step S306. When the vehicle requires multiple times of turnabouts of the parking route without extending the route, the process proceeds to step S307 to perform the route extension process.

In step S306, when the posture of the vehicle at the parking position is assumed to be 0 degrees, it is determined whether the posture of the vehicle at the turning point exceeds a predetermined value. For example, if the posture of the vehicle at the turning point is 90 degrees, the vehicle can be parked with one turnabout, but the vehicle moves backward while turning at a steep angle, which causes the driver fear. In order to avoid such a situation, in the case where the posture of the vehicle at the turning point exceeds a predetermined value, i.e., in the case where the amount of change in the vehicle orientation during backward movement of the vehicle exceeds a predetermined amount, the route extension process is performed in the next step S307 to reduce the amount of change in the vehicle orientation when moving backward. When the posture of the vehicle at the turning point does not exceed the predetermined value in step S306, the process proceeds to step S308.

In step S307, route information for extending the parking route from the turning point in the route information toward the newly detected available area is generated based on the route information that has been output in step S302, the surrounding area information and the own-vehicle position information that have been output in step S303, which will be detailed later with reference to FIG. 4, and the process proceeds to step S308.

In step S308, the steering-pattern generation unit 33a generates steering-angle information based on the route information, and the process proceeds to step S309.

In step S309, the speed determination unit 34a generates speed information based on surrounding area information, the own-vehicle information, the route information, and the steering-angle information that has been output in step S308.

In the next step S310, the vehicle control unit 35 controls the vehicle using the steering-angle information that has been output in step S308, the speed information that has been output in step S309, and the own-vehicle position information. Then, the process proceeds to step S311.

In step S311, it is determined whether or not the own vehicle has reached the target parking position according to the vehicle control in step S310 is determined. When it is determined that the own vehicle has reached the target parking position, the process ends, and when it is determined that the own vehicle has not reached the target parking position, the process returns to step S303.

By performing the steps shown in FIG. 3, when a newly available area is recognized in the extension direction of the parking route during traveling of the vehicle on a previously planned parking route, the parking route can be appropriately extended in the extension direction of the parking route. Further, the extension of the parking route is performed by adding extension-route information generated by the route extension unit 32a to the route information generated by the route generation unit 31a, and thus excels in calculation speed as compared with multiple operation of the route generation unit 31a to correct the route.

Figure 4:
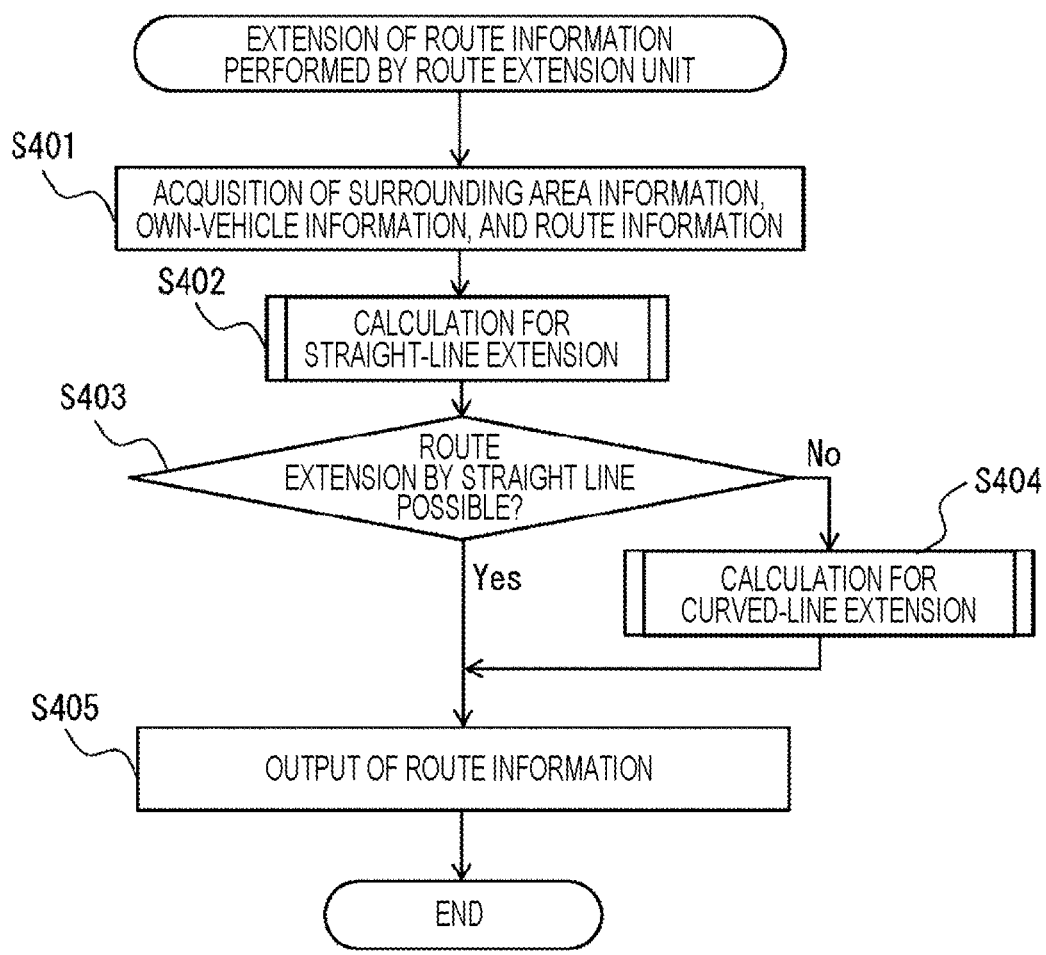
FIG. 4 is a flowchart showing the steps of route extension process.

FIG. 4 is a flowchart showing the steps of route extension process. FIG. 4 shows the detailed procedure of step S307 in FIG. 3.

In step S401 of FIG. 4, the surrounding area information acquired by the external information acquisition unit 10 in step S303, the own vehicle information acquired by the own-vehicle information unit 24 and the own-vehicle position information unit 25, and the route information output by the route generation unit 31a in step S302 are acquired, and the process proceeds to step S402.

In step S402, a straight-line distance to the point that enables the traveling own vehicle to reach the target parking position without a further turnabout after one turnabout is calculated based on the route information and the own vehicle information acquired in step S401, which will be detailed later with reference to FIG. 5, and the process proceeds to step S403.

In step S403, it is determined whether or not the route can be extended by a straight line based on the straight-line distance calculated in step S402 and the route information and the own vehicle information acquired in step S401. When the route is determined to be extensible, the process proceeds to step S405, and when the route is determined to be inextensible, the process proceeds to step S404.

In step S404, a curved-line distance that forms an arc of the minimum turning radius of the vehicle is added based on the route information and the vehicle information acquired in step S401, which will be detailed later with reference to FIG. 6. Then, the process proceeds to step S405.

In step S405, route information starting from the current position of the own vehicle is output using the route extension distance calculated in step S402 or in step S404, and a series of steps is terminated.

By performing the steps shown in FIG. 4, a straight line or a curved line is added to the originally planned parking route to achieve the parking route that reduces the number of times of subsequent turnabouts.

Figure 5:
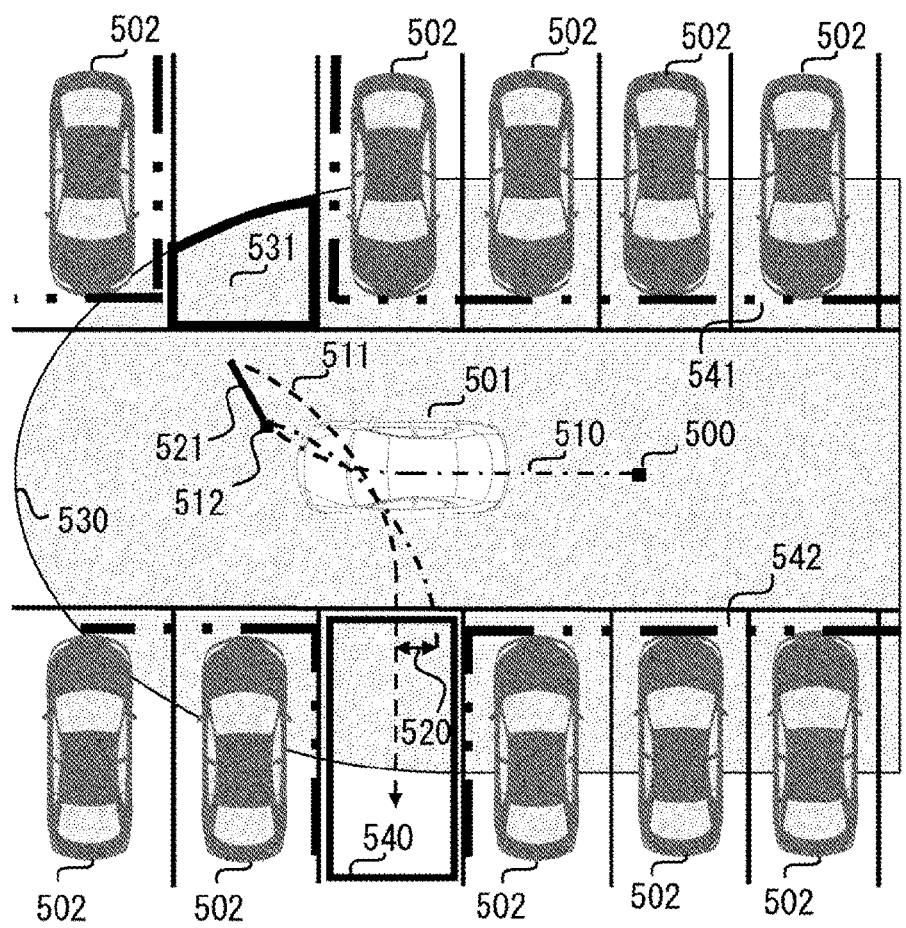
FIG. 5 is a diagram illustrating straight-line extension performed by a route extension unit.

FIG. 5 is a diagram illustrating straight-line extension performed by the route extension unit 32a. FIG. 5 is a diagram illustrating details of step S402 in FIG. 4.

As shown in FIG. 5, an area-line 541 and an area-line 542 shown by the chain double-dotted lines respectively indicate the areas surrounded by other vehicles 502, which is a limiting factor for the surrounding area of the own vehicle. The own vehicle 501 is parked at the target parking position 540 from the parking start position 500. A parking route 510 generated by the route generation unit 31a is shown by the one-dot chain line.

When a new available area 531 is detected in a surrounding recognition area 530 during traveling of the own vehicle 501 on the parking route 510, a distance difference 520 between a parking route 511 (shown by the dotted line) and the parking route 510 (shown by the one-dot chain line) is calculated. The parking route 511 is a parking route that enables the own vehicle 501 to reach the target parking position 540 by moving the own vehicle 501 backward with no turnabout, and the parking route 510 is a parking route acquired when turning the own vehicle 501 around at a turning point 512 of the parking route 510. Then, the route extension unit 32a calculates a straight travel distance 521 from the turning point 512 of the parking route 510 that eliminates the distance difference 520. In other words, the distance difference between the target parking position and the position at which the vehicle orientation during backward movement along the parking route coincides with the orientation of the vehicle at the target parking position is calculated, and the straight travel distance corresponding to the calculated distance difference is added. Specifically, where the distance difference 520 is Diff_L and the straight travel distance 521 is L when the azimuth angle of the vehicle at the turning point 512 of the parking route 510 is θ, L is given by the following equation (1).

[Equation 1]

$$L = \text{Diff\_L}/\cos(\theta) \quad (1)$$

Figure 6:
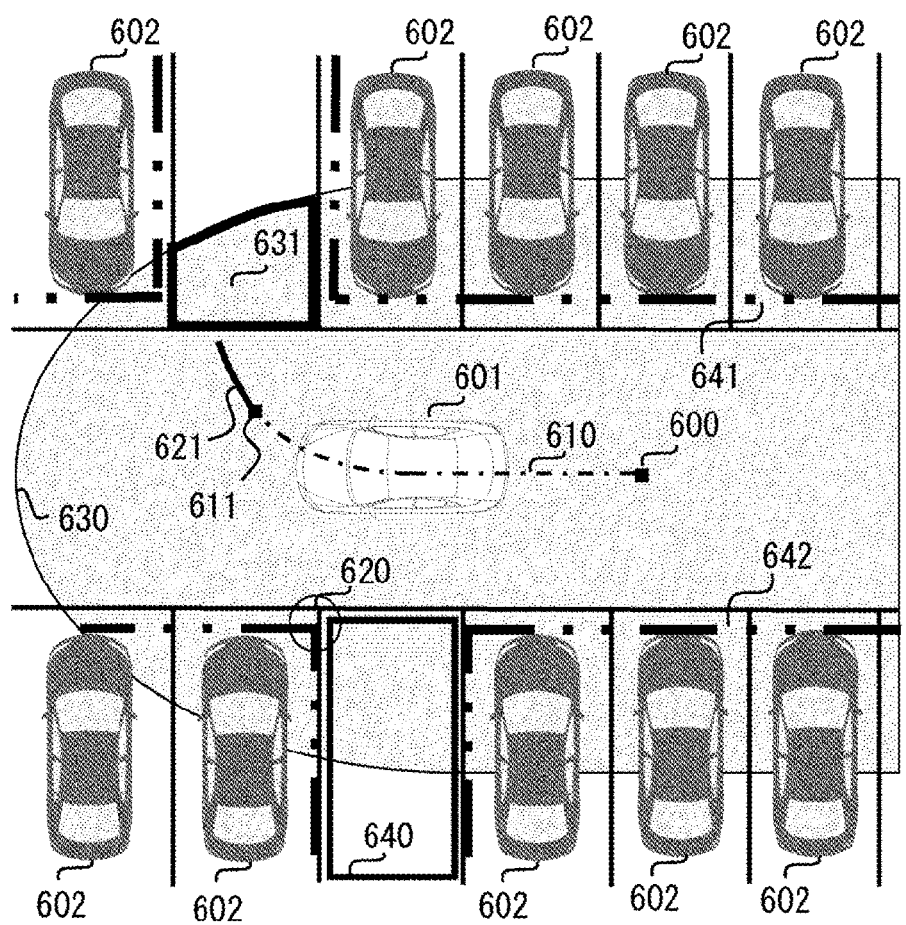
FIG. 6 is a diagram illustrating curved-line extension performed by the route extension unit.

FIG. 6 is a diagram illustrating curved-line extension performed by the route extension unit 32a. FIG. 6 is a diagram illustrating the details of step S404 in FIG. 4.

As shown in FIG. 6, an area-line 641 and an area-line 642 shown by the chain double-dotted lines respectively indicate the areas surrounded by other vehicles 602, which is a limiting factor for the surrounding area of the own vehicle. The own vehicle 601 is parked at the target parking position 640 from the parking start position 600. A parking route 610 generated by the route generation unit 31a is shown by the one-dot chain line.

When a new available area 631 is detected in a surrounding recognition area 630 during traveling of the own vehicle 601 on the parking route 610, the route extension unit 32a calculates a curved-line distance 621 from a turning point 611 of a parking route 610 according to the current curvature, while maintaining the vehicle orientation in which the left rear wheel of the own vehicle 601 does not enter an inner-wheel-difference collision area 620. The curved line indicated by the curved-line distance 621 forms an arc of the minimum turning radius of the vehicle.

Figure 7:
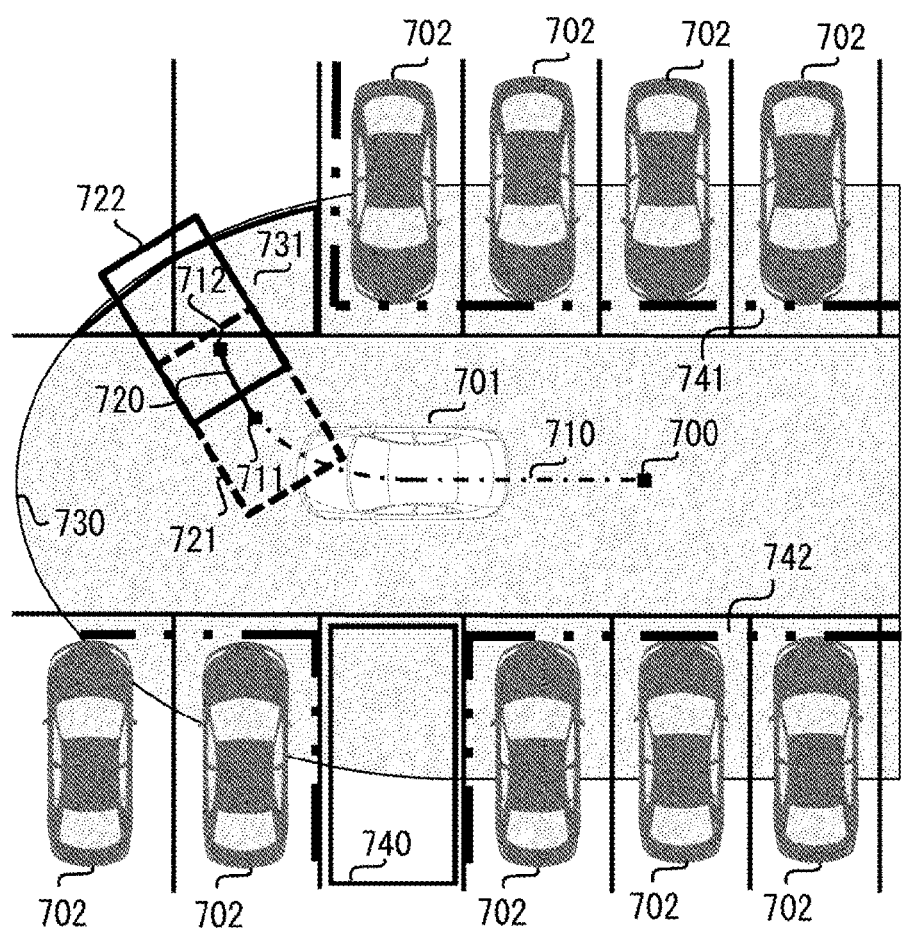
FIG. 7 is an example of an image of route extension displayed on a route-information-image generation unit.

FIG. 7 is an example of an image of route extension generated by a route-information-image generation unit 40 and displayed on a display device (not shown). The route-information-image generation unit 40 generates an image that presents the driver with visual information about the parking status.

As shown in FIG. 7, an area-line 741 and an area-line 742 shown by the chain double-dotted lines respectively indicate the areas surrounded by other vehicles 702, which is a limiting factor for the surrounding area of the own vehicle. The own vehicle 701 is parked at the target parking position 740 from the parking start position 700. A parking route 710 generated by the route generation unit 31a is shown by the one-dot chain line.

When a new available area 731 is detected in a surrounding recognition area 730 during traveling of the own vehicle 701 on the parking route 710, the route-information-image generation unit 40 generates a route image in which an extension route 720 is superimposed, and displays it on the display device for the driver as the extension route 720 is added to a turning point 711 of the parking route 710. Furthermore, the route-information-image generation unit 40 generates a display image in which an image of a turning outline 721 at the turning point 711 before extending the parking route is superimposed with or shifted to an image of a turning outline 722 at a turning point 712 for the extended parking route. Alternatively, the route-information-image generation unit 40 may generate a display image in which the image of the turning outline 721 at the turning point 711 before extending the parking route is superimposed with or shifted to an image of a turning outline from the turning point 711 to the turning point 712 acquired by continuously extending the parking route. Alternatively, the route-information-image generation unit 40 may generate at least an image of an extended turning outline, i.e., the turning outline 722 at the final turning point 712. At the same time, a display for notifying the driver of the route extension may also be generated.

Figure 8:
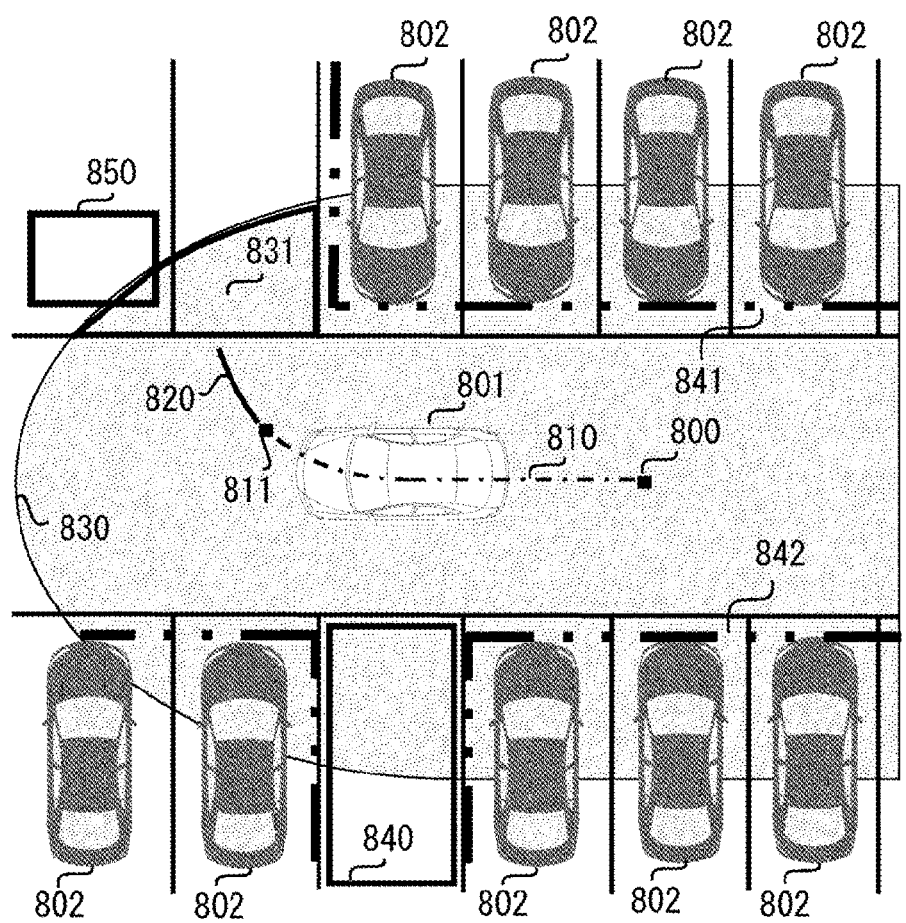
FIG. 8 is a diagram illustrating an example of a case where an obstacle is detected in the route extension direction.

FIG. 8 is a diagram illustrating an example of a case where an obstacle 850 is detected in the route extension direction. As shown in FIG. 8, an area-line 841 and an area-line 842 shown by the chain double-dotted lines respectively indicate the areas surrounded by other vehicles 802, which is a limiting factor for the surrounding area of the own vehicle. The own vehicle 801 is parked at the target parking position 840 from the parking start position 800. A parking route 810 generated by the route generation unit 31a is shown by the one-dot chain line.

The following description describes, as an example, the case where an obstacle 850 is detected in the extension direction of the parking route 810 when a new available area 831 is detected in a surrounding recognition area 830 during traveling of the own vehicle 801 on the parking route 810 and an extension route 820 is added from a turning point 811 of the parking route 810. In this case, the external information acquisition unit 10 detects the position and speed of the obstacle 850, and the speed determination unit 35a generates speed information for the route information according to the position and speed of the obstacle 850. In the case where the obstacle 850 is a stationary object, the continuity of traveling of the own vehicle 801 accompanied by the route extension cannot be ensured, and thus the speed determination unit 35a cancels or suspends the route extension without generating the speed information. In the case where the obstacle 850 is a moving object, the continuity of traveling of the own vehicle 801 accompanied by the route extension can be ensured, and thus the speed determination unit 35*a* generates speed information that can ensure the continuity corresponding to the speed of the moving object to allow the route extension unit 32*a* to continue the route extension.

Figure 9:
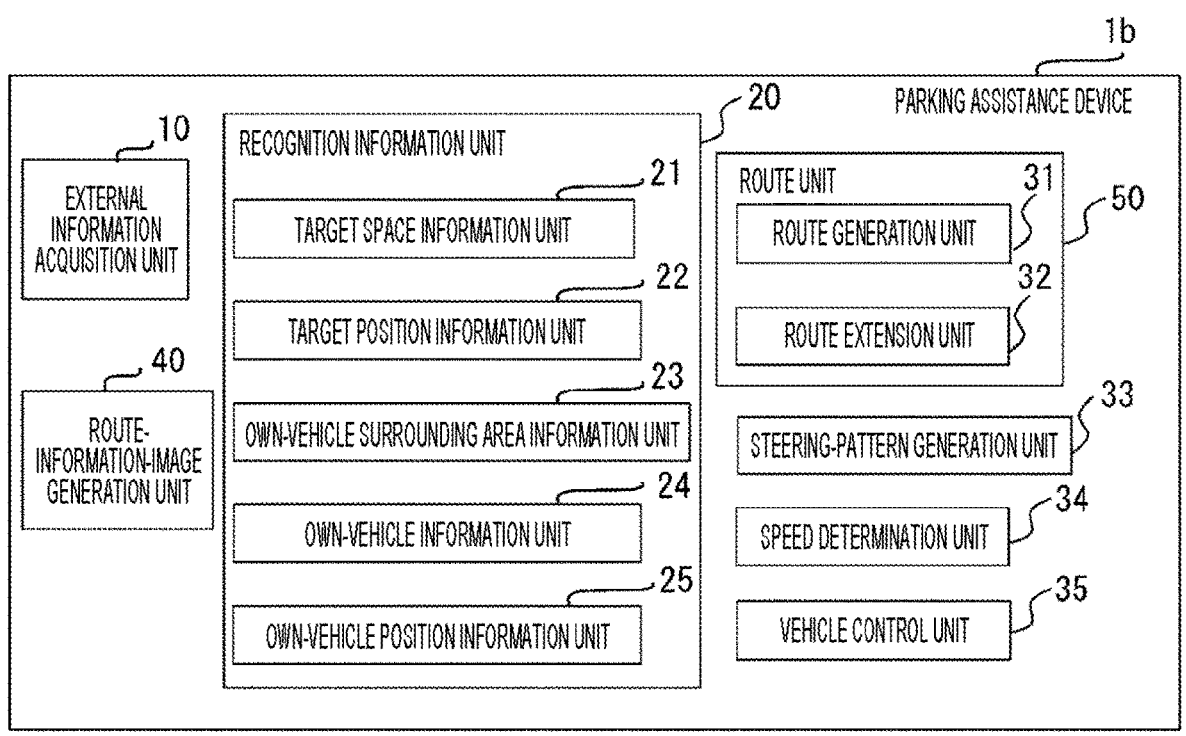
FIG. 9 is a diagram showing another configuration of the parking assistance device.
Figure 10:
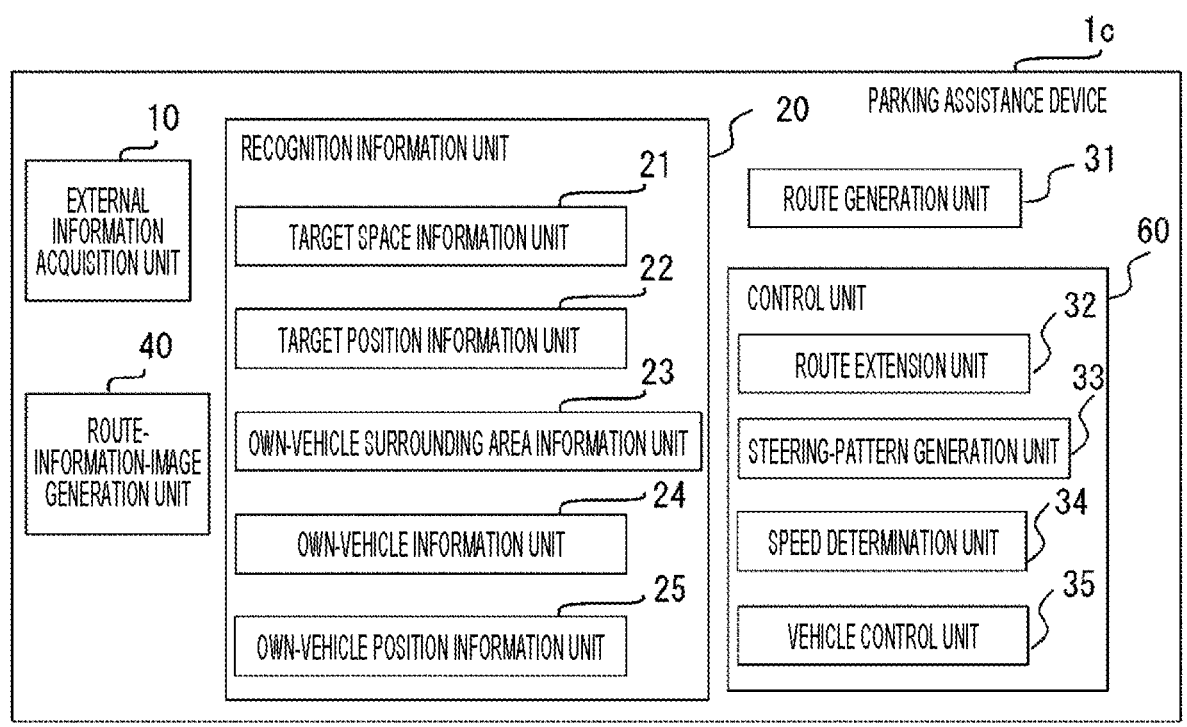
FIG. 10 is a diagram showing another configuration of the parking assistance device.

The parking assistance device 1, 1*a* in the present embodiment is not limited to the configuration shown in FIG. 1 or 2, and may have the configuration shown in FIG. 9 or 10. Note that the same components as those in FIG. 1 or 2 are denoted by the same reference numerals, and description of each component will be omitted.

A parking assistance device 1*b* of FIG. 9 includes: the external information acquisition unit 10; the recognition information unit 20; a route unit 50; the steering-pattern generation unit 33; the speed determination unit 34; the vehicle control unit 35; and the route-information-image generation unit 40. Furthermore, the recognition information unit 20 includes: the target space information unit 21, the target position information unit 22, the own-vehicle surrounding area information unit 23, the own-vehicle information unit 24, and the own-vehicle position information unit 25, and the route unit 50 includes: the route generation unit 31; and the route extension unit 32.

A parking assistance device 1*c* of FIG. 10 includes: the external information acquisition unit 10; the recognition information unit 20; the route generation unit 31; a control unit 60, and the route-information-image generation unit 40. Furthermore, the recognition information unit 20 includes: the target space information unit 21; the target position information unit 22; the own-vehicle surrounding area information unit 23; the own-vehicle information unit 24; and the own-vehicle position information unit 25, and the control unit 60 includes: the route extension unit 32; the steering-pattern generation unit 33; the speed determination unit 34; and the vehicle control unit 35.

According to the embodiments described above, the following operational effects can be obtained.

(1) The parking assistance devices 1, 1*a*, 1*b*, 1*c* each include: the recognition information unit 20 configured to recognize the surrounding area of the vehicle by acquiring external information; and the route generation unit 31, 31*a* configured to generate a parking route from the current position of the vehicle to the target parking position based on the recognized surrounding area, and, when the recognition information unit 20 recognizes a new area on an extension of the parking route as the vehicle travels along the parking route, the parking assistance devices 1, 1*a*, 1*b*, 1*c* extend the parking route into the recognized new area. With this configuration, an area that cannot be recognized from the parking start position and is newly recognized according to traveling of the vehicle can be effectively used as a parking route.

The present invention is not limited to the above-described embodiments, and other forms conceivable within the scope of the technical idea of the present invention are also included in the scope of the present invention as long as the characteristics of the present invention are not impaired.

REFERENCE SIGNS LIST

1 parking assistance device
10 external information acquisition unit
20 recognition information unit
21 target space information unit
22 target position information unit
23 own-vehicle surrounding area information unit
24 own-vehicle information unit
25 own-vehicle position information unit
31 route generation unit
32 route extension unit
33 steering-pattern generation unit
34 speed determination unit
35 vehicle control unit
40 route-information-image generation unit

The invention claimed is:

1. A parking assistance device comprising:
at least one processor configured to:
recognize a surrounding area of a vehicle by acquiring external information; and
generate a parking route from a current position of the vehicle to a target parking position based on the recognized surrounding area,
wherein when the at least one processor is configured to recognize a new area on an extension of the parking route as the vehicle travels along the parking route, the parking assistance device extends the parking route into the recognized new area,
generate an extension route when the at least one processor recognizes the new area on the extension of the parking route, the extension route being generated by extending the parking route into the recognized new area;
extend the parking route into the new area recognized on the extension of the parking route;
generate the extension route when the parking route generated by the at least one processor includes multiple times of turnabouts;
calculate a distance difference between the target parking position and a position at which vehicle orientation during backward movement along the parking route coincides with vehicle orientation at the target parking position; and
generate the extension route corresponding to a straight travel distance according to the calculated distance difference.

2. The parking assistance device according to claim 1, wherein the at least one processor is configured to extend the parking route into the new area recognized on an extension of the parking route, and generate the extension route when the parking route generated includes one turnabout and an amount of change in vehicle orientation during backward movement of the vehicle exceeds a predetermined amount.

3. The parking assistance device according to claim 1, wherein the at least one processor is configured to generate the extension route corresponding to a curved-line distance that forms an arc of a minimum turning radius of the vehicle when the straight travel distance cannot be added.

4. The parking assistance device according to claim 1, wherein the at least one processor is configured to:
generate a display image to display the parking route on a display device installed in the vehicle, and
generate the display image in which an image of the extended parking route is superimposed on the parking route.

5. The parking assistance device according to claim 4, wherein the at least one processor is configured to generate the display image in which an image of a turning outline at a turning point before extending the parking route is superimposed with or shifted to an image of a turning outline at a turning point for the extended parking route.

6. The parking assistance device according to claim 4, wherein the at least one processor is configured to generate the display image in which an image of a turning outline at a turning point before extending the parking route is superimposed with or shifted to an image of a turning outline at turning points obtained by continuously extending the parking route.

7. The parking assistance device according to claim 4, wherein the at least one processor is configured to generate an image of a turning outline at a final turning point for the extended parking route.

8. The parking assistance device according to claim 1, wherein when an obstacle is detected in a direction for extending the parking route, the at least one processor is configured to cancel, suspend, or continue generation of the extension route according to a position and speed of the obstacle.

9. The parking assistance device according to claim 8, wherein the at least one processor is configured to:
   determine a speed of the vehicle for traveling on the parking route, and
   change the speed of the vehicle according to the position and speed of the obstacle in the direction for extending the parking route.

\* \* \* \* \*